US006092855A

United States Patent [19]

Rezzonico

[11] Patent Number: 6,092,855

[45] Date of Patent: Jul. 25, 2000

[54] FLAP ARRANGEMENT FOR A MOTOR VEHICLE BODY

[75] Inventor: Luca Rezzonico, Sickte, Germany

[73] Assignee: Volkswagen AG, Wolfsburg, Germany

[21] Appl. No.: 09/267,833

[22] Filed: Mar. 12, 1999

Related U.S. Application Data

[63] Continuation of application No. PCT/EP97/04591, Aug. 22, 1997.

[30] Foreign Application Priority Data

Sep. 21, 1996 [DE] Germany ........................... 196 38 719

[51] Int. Cl.[7] ........................ B62D 25/00

[52] U.S. Cl. ........................ 296/97.22

[58] Field of Search ........................ 296/97.22, 146.8, 296/146.9, 195

[56] References Cited

U.S. PATENT DOCUMENTS

| | | | |
|---|---|---|---|
| 1,905,568 | 4/1933 | Radke | 296/97.22 |
| 2,258,812 | 10/1941 | Ross | 296/97.22 |
| 2,314,710 | 3/1943 | Keller | 296/97.22 |
| 2,606,772 | 8/1952 | Mead et al. | 296/97.22 |
| 2,765,179 | 10/1956 | Clark et al. | 296/97.22 |
| 5,437,491 | 8/1995 | Nedbal et al. | 296/97.22 |
| 5,718,471 | 2/1998 | McHorse | 296/97.22 |

FOREIGN PATENT DOCUMENTS

| | | |
|---|---|---|
| 6819807 | 4/1968 | Germany . |
| 8601922 | 1/1986 | Germany . |
| 3940016 | 12/1989 | Germany . |

*Primary Examiner*—D. Glenn Dayoan
*Assistant Examiner*—Lori L. Coletta
*Attorney, Agent, or Firm*—Baker Botts L.L.P.

[57] ABSTRACT

A flap arrangement for a vehicle body includes a manually actuated flap and an access recess provided in the adjacent region of the vehicle for engaging the flap from behind. This enables a flap arrangement to be provided in a motor vehicle having a body design which provides only a limited space for the flap. The flap and a rear lamp in the car body are arranged next to each other, and the access recess is formed in the diffuser of the rear lamp.

5 Claims, 2 Drawing Sheets

FLAP ARRANGEMENT FOR A MOTOR VEHICLE BODY

REFERENCE TO RELATED APPLICATION

This application is a continuation of International Application No. PCT/EP97/04591 filed Aug. 22, 1997.

BACKGROUND OF THE INVENTION

This invention relates to flap arrangements for motor vehicles and, in particular, flap arrangements for the flap of a fuel tank cover or for a hatchback.

Manually actuatable flaps on motor vehicle bodies provided with an actuation access are known. An actuation access for a tank cover may include a bulge on the outside of the cover under which the operator can insert a finger to open the tank cover. It is also known to provide a trough in the vehicle body next to the tank cover to permit engagement of the cover to open it. The combination of a bulge on the tank cover and a trough in the adjacent body portion is also known. It is likewise known that a tank cover can be provided with a recess through which an operator can insert a finger to raise the cover.

German Offenlengungsschrift No. 39 40 016 discloses a flap in the form of a liftable rear cover, i.e. a hatchback, arranged on a motor vehicle body and having at least one lamp with a light-transmissive diffuser in which the diffuser includes at least one grip portion recessed below its surface or projecting beyond it for raising the flap. Thus, the light diffuser includes either a trough or a ledge to provide access for lifting the flap. This lifting member is formed directly on the diffuser which is mounted on the flap, providing a one-piece configuration which avoids any increase in cost. The lifting member may be located along the lower edge of the diffuser. By a suitable application of force to the lifting member, the hatchback flap may be swung up and down for opening or closing .

Especially in the case of compact vehicles, a mechanical arrangement for assisting operation of a manually engageable lifting member on a motor vehicle body may be difficult to provide because of a lack of space in the adjacent vehicle body.

SUMMARY OF THE INVENTION

Accordingly, it is an object of the present invention to provide a flap arrangement for a motor vehicle body which overcomes disadvantages of the prior art.

Another object of the invention is to provide a flap arrangement for a motor vehicle body in which the space for providing a manually engageable flap is severely limited.

These and other objects of the invention are attained by providing a manually engageable flap and a tail light located adjacent to each other on a vehicle body, and a recess in a light transmissive diffuser of the tail light adjacent to the flap. In this way, a flap arrangement having an access recess next to the flap can be provided despite a lack of space in the vehicle body. At the same time, the tail light configuration can be arranged in accordance with preferences and requirements as to the vehicle body configuration.

The access recess may constitute a depression which increases in depth in the direction of the flap to receive at least one finger of an operator.

In addition, the flap may include an outward bulge in the region of the adjacent access recess, so that both the depth of the recess and the height of the bulge may be smaller.

Alternatively, the access recess instead of having an increasing depth, is a recess having the same depth in the direction perpendicular to the tail light surface throughout its length.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Figure 1:
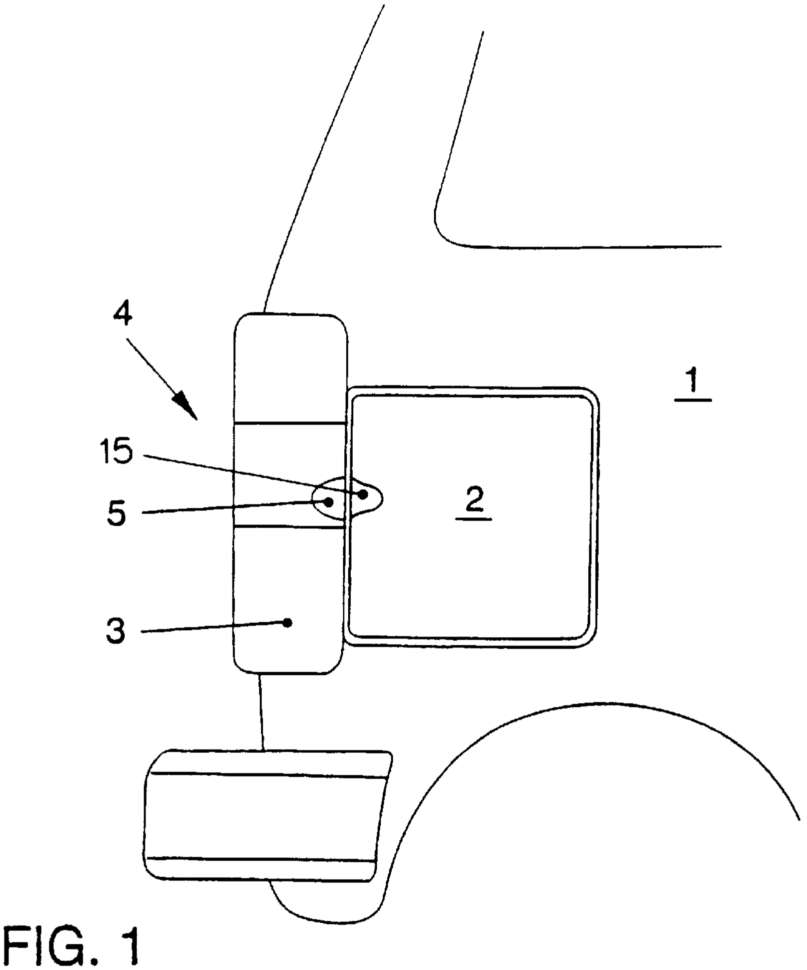
FIG. 1 is a schematic view illustrating a representative embodiment of a tank cover flap arrangement according to the invention.

In the typical embodiment shown in FIG. 1, a flap arrangement for a motor vehicle body 1 having a tank cover 2 at the rear of the vehicle is illustrated.

Figure 2A:
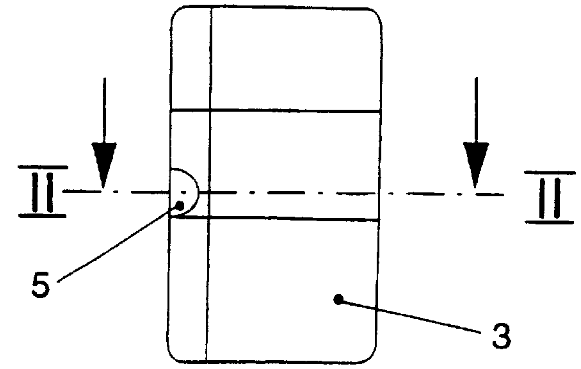
FIG. 2*a* is a side view of the tail light shown in FIG. 1 as seen from the location of the tank cover.
Figure 2B:
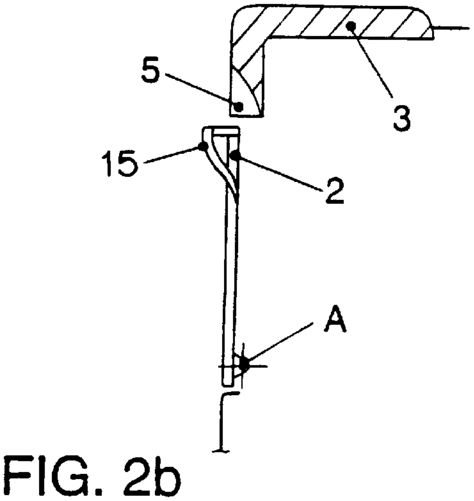
FIG. 2*b* is a cross-sectional view of the tail light taken along the line II—II of FIG. 2*a*.

The tank cover 2 is adjacent to a transparent light diffuser 3 of a tail light 4. In the light diffuser 3, an access recess 5 for the cover is provided by a trough which increases in depth in the direction toward the tank cover 2 into which an operator's finger can be conveniently inserted so as to extend behind the tank cover 2. The tank cover has an outward bulge 15 in a region adjacent to the access recess 5. FIGS. 2*a* and 2*b* show the configuration of the access recess 5 in greater detail. Specifically, FIG. 2*b* shows that the back of the tank cover 2 can be engaged through the recess 5 and that the tank cover is swingable about a vertical axis A.

Figure 3:
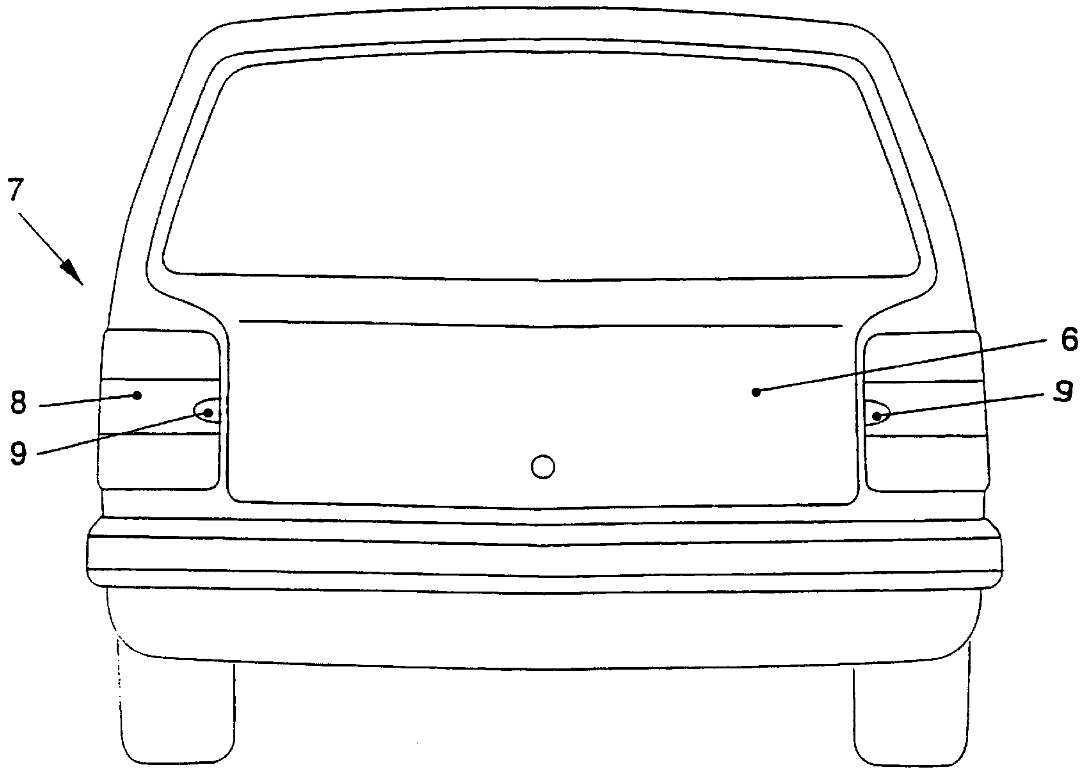
FIG. 3 is a schematic view illustrating a representative embodiment of a hatchback flap arrangement according to the invention.

FIG. 3 shows the rear of a motor vehicle having a hatchback 6 which is adjacent on each side to a tail light 7 formed with an access recess 9 in a transparent light diffuser 8. At each of the two access recesses 9, the hatchback flap 6 can be engaged to raise it up. The configuration of the access recess 5 or 9 in the transparent light diffuser 3 or 8 is simple to make by injection molding of the diffuser.

Because of the arrangement of the access recesses 5 and 9 in the adjacent light diffuser 3 or 8, respectively, of the tail light 4 or 7, the tank cover flap 2 and the hatchback flap 6 can be opened with considerably greater ease.

Although the invention has been described herein with reference to specific embodiments, many modification and variations therein will readily occur to those skilled in the art. Accordingly, all such variations and modifications are included within the intended scope of the invention.

I claim:

1. A flap arrangement for a motor vehicle body comprising:

a manually engageable flap member mounted on a motor vehicle body;

a tail light for the motor vehicle adjacent to the flap member having a diffuser; and an access recess formed in the tail light diffuser permitting manual access to the flap member.

2. A flap arrangement according to claim 1 wherein the access recess is a trough having increasing depth in the direction toward the flap member to receive at least one finger of an operator.

3. A flap arrangement according to claim 1 wherein the flap member includes an outward bulge in a region adjacent to the access recess.

4. A flap arrangement according to claim 1 wherein the access recess is a trough formed in a light transparent diffuser of the tail light.

5. A tail light for a motor vehicle comprising a tail light member fixedly mounted on a motor vehicle body adjacent to a manually actuatable flap member and having a diffuser formed with an access recess to permit manual access to raise the flap member.

* * * * *